(12) United States Patent
Takenouchi et al.

(10) Patent No.: US 8,194,032 B2
(45) Date of Patent: Jun. 5, 2012

(54) IMAGE DISPLAY MEDIUM, PREPARATION METHOD THEREOF

(75) Inventors: Shigeki Takenouchi, Tokyo (JP); Eiichi Sakai, Kanagawa (JP); Tatsuya Nagase, Tokyo (JP); Okushi Okuyama, Tokyo (JP); Yukio Hosoya, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 691 days.

(21) Appl. No.: 12/354,650

(22) Filed: Jan. 15, 2009

(65) Prior Publication Data

US 2009/0189851 A1    Jul. 30, 2009

(30) Foreign Application Priority Data

Jan. 24, 2008    (JP) .................................. 2008-013512

(51) Int. Cl.
*G09G 3/34*    (2006.01)

(52) U.S. Cl. ............................ 345/107; 345/83; 345/72
(58) Field of Classification Search .................. None
See application file for complete search history.

(56) References Cited

U.S. PATENT DOCUMENTS 7,545,557 B2 *   6/2009   Iftime et al. .................. 359/296

FOREIGN PATENT DOCUMENTS

| JP | 2003-241231 A | 8/2003 |
| JP | 2004-184632 A | 7/2004 |
| JP | 2005-266641 A | 9/2005 |

* cited by examiner

*Primary Examiner* — Muhammad N Edun
(74) *Attorney, Agent, or Firm* — Buchanan Ingersoll & Rooney PC (57) ABSTRACT

An image display medium is disclosed, which medium includes a pair of substrates each having an electrode and colored particles between the pair of substrates, and the colored particles have an absolute electric charge of 0.5 to 4.0 μC/g.

13 Claims, 3 Drawing Sheets

IMAGE DISPLAY MEDIUM, PREPARATION METHOD THEREOF

This application is based on Japanese Patent Application No. 2008-13512 filed on Jan. 24, 2008, the entire content of which is hereby incorporated by reference.

TECHNICAL FIELD

This invention relates to an image display medium capable of repeatedly displaying and disappearing images accompanied with electrostatic movement of particles, its preparation method and an image displaying method using the display method.

TECHNICAL BACKGROUND

Hitherto, image displaying methods using technologies such as an electrophoretic method, an electrochromic method, thermal method and dichromatic particle rotation method have been proposed instead of the liquid crystal display (LCD) method. The purpose of these methods is to obtain merits such as that wide viewing angle is near that of usual printed matters, electric consumption is low and the display medium has a memorizing ability, compared with the LCD. Therefore, such the media can be considered as next generation display medium with low cost and are expected to be developed in the field of display for portable terminals or electronic paper.

Moreover, an electrophoretic method is recently proposed, in which dispersion composed of dispersed particles and colored liquid is placed between facing substrates. However, the electrophoretic method has problems such as that the particles are easily precipitated so that the stability of the dispersed state is difficultly maintained since particles having high specific gravity such as titanium oxide are dispersed in a liquid having low specific gravity and stability of repeatedly displaying images is lacking because durability for long term is low since a dye is used for coloring the liquid. As a countermeasure of the above problems, a method is proposed for seemingly not appearing such the problems by enclosing the dispersion in microcapsules but the problems are not solved yet. Furthermore, it is also a problem that the density is not correctively displayed since the boundary of touching portion of the microcapsules occupies relatively large area when the system is viewed from outside.

On the other hand, a method is proposed, in which charged particles are moved in gas. The problems caused in the electrophoretic method such as precipitation or coagulation of the particles are solved in this method. However, much higher driving voltage is necessary to move the particles in comparison with the electrophoretic method, and it is an obstacle to use in so called electric paper and so on.

A technology is required to transport and incorporating charged particles in an image display medium for a preparation of image display medium in which charged particles are moved in gas. A method is proposed in which particles are adhered onto substrate by a spray gun employing a principle of an electric coating, for example, as described in Patent Publication 1.

Proposed is another method in which charged particles are made as an aerosol state and are moved by an electric field force formed by electrodes, for example, as described in Patent Publication 2.

Proposed is the other method in which charged particles are provided to the surface of the substrate, and excess amount of the particles are removed by mechanical function such as a pressure plate or blade to leave necessary amount of particles on the substrate, for example, as described in Patent Publication 23.

However it is difficult to control the moving amount of the particles charge amount of the moved particles accurate as expected, display characteristics are not attained as expected, a clear image having sufficient density and contrast is not obtained as the result.

Thus a technology to obtain an image display medium for a use of, for example, electric paper is not sufficient.

Patent Publication 1: JP A 2003-241231
Patent Publication 2: JP A 2004-184632
Patent Publication 3: JP A 2005-266641

SUMMARY OF THE INVENTION

The object of the invention based on the above-mentioned background is to provide an image displaying medium comprising facing substrates and colored particles and an image displaying method by which largely lowering in the driving voltage and clear image display having high density and high contrast can be attained.

It is found by the inventors that the problems can be solved such the problems by an image displaying medium at least having a space between a displaying side substrate and a back side substrate and colored particles are placed and enclosed in the space and display is carried out by applying electric field, in which the enclosed colored particles are charged at a charging amount of from 0.5 to 4.0 µC/g in absolute value.

An image display medium comprising a pair of substrates each having an electrode, and colored particles in a space formed between the pair of substrates, wherein the colored particles have absolute electric charge of 0.5 to 4.0 µC/g.

Examples of preferable embodiment are described below.

(1) An image displaying medium at least having a displaying side substrate and a back side substrate each having an electrode and a space between the substrates and colored particles are placed and enclosed in the space, in which the enclosed colored particles are charged at a charging amount of from 0.5 to 4.0 µC/g in absolute value.

(2) The image displaying medium described in the above (1), in which the colored particles are electrically charged and enclosed by an electrophotographic developing method.

(3) An image displaying method, in which the image is formed by using the image display medium described in the above (1) or (2).

The image display medium comprising the facing substrates and the colored particles and the image forming method can be provided by which the driving voltage can be largely lower and clear images can be formed. Furthermore, the image display medium and the image forming method having sufficient bending ability can be provided.

PREFERABLE EMBODIMENT FOR PRACTICING THE INVENTION

The image display medium of the invention and parts to be used in the image display medium, the preparation method thereof and the image forming method are described further below.

Fundamental Arrangement

The fundamental arrangement of the image display medium is described.

An electric field is applied to the colored particles enclosed between the facing two substrates in the image display medium. The electrically charged particles are attracted by Coulomb's force by the electric field along the electric field direction. As a result of that, the image is displayed by changing the moving direction of the colored particles accompanied with the variation of the electric field direction.

Figure 1:
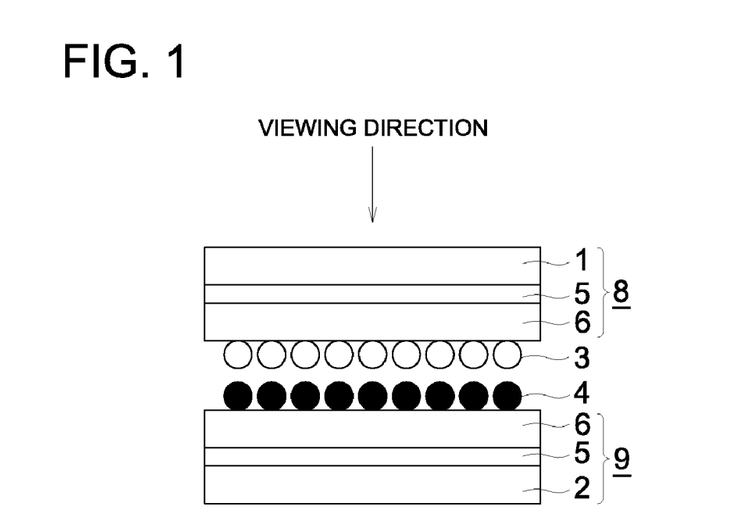
FIG. 1 shows a cross-section view for describing the constitution of an image display medium (information displaying panel)

An example of the image display medium (image displaying panel) id described according to FIG. 1.

In the example shown in FIG. 1, two kinds of colored particles different from each other at least in the optical reflectivity and charging property (here, each represented by white particles 3 and black particles 4) are placed between electrodes 5 each provided on a substrates 8 and 9, respectively, and moved in the vertical direction to the substrates 8 and 9 by an electric field generated by applying voltage to the electrodes from and electric source not shown in the drawing to form an image to be displayed. When the image is black, the black particles 4 are displayed so as to be shown by the observer and when the image is white, the white particles 3 are displayed so as to be shown by the observer. As the means for applying the electric field for driving the particles, it is preferable to provide the electrodes on the substrates 8 and 9 as shown in FIG. 1, though the electric field can be applied from the outside of the image display medium. For instance, a partition 7 having the shape shown in FIG. 2 may be provided between the facing electrodes shown in FIG. 1b whereby particles are contained in plurality of divided area called cells, though the partition is not shown in FIG. 1. The shape and the distance of the partition are decided according to necessity.

In FIG. 1, an insulation layer 6 is provided on the electrode 5 and the substrate is touched with the colored particles at the surface of the insulation layer, such the structure is generally preferred. Such the structure can be optionally applied in the practical image display medium.

The colored particles may be one kind though the example using two kinds of the particles is described in FIG. 1. In such the case, the colored particle different from the back side electrode in the color are used. For example, the color of the colored particles is displayed by the movement of the colored particles to the displaying side substrate and the color of the back side substrate is displayed by the movement of the colored particles to the circumstance of the cell formed by the partition, thus two kinds of color can be displayed.

When two kinds of colored particle are used as in FIG. 1, particles each positively or negatively charged, respectively, by the friction with each other are preferably used.

Preparation of Image Display Medium

Figure 2:
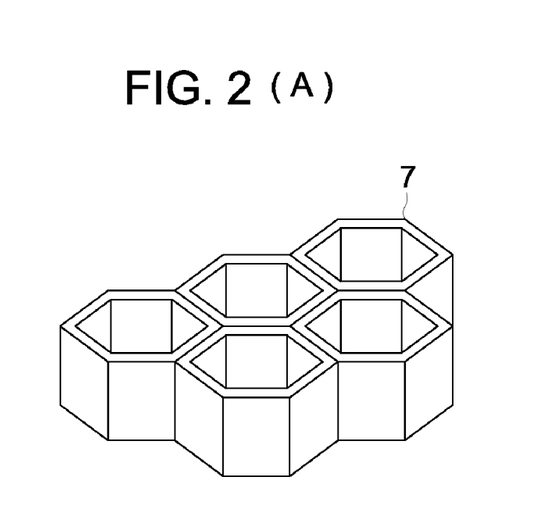
FIGS. 2(A) and 2(B) show a perspective view showing the shape of partition.

For preparing the image display medium having the constitution described in FIGS. 1 and 2, the previously charged colored particles are enclosed into the space formed between the displaying side substrate and the back side substrate.

Figure 3:
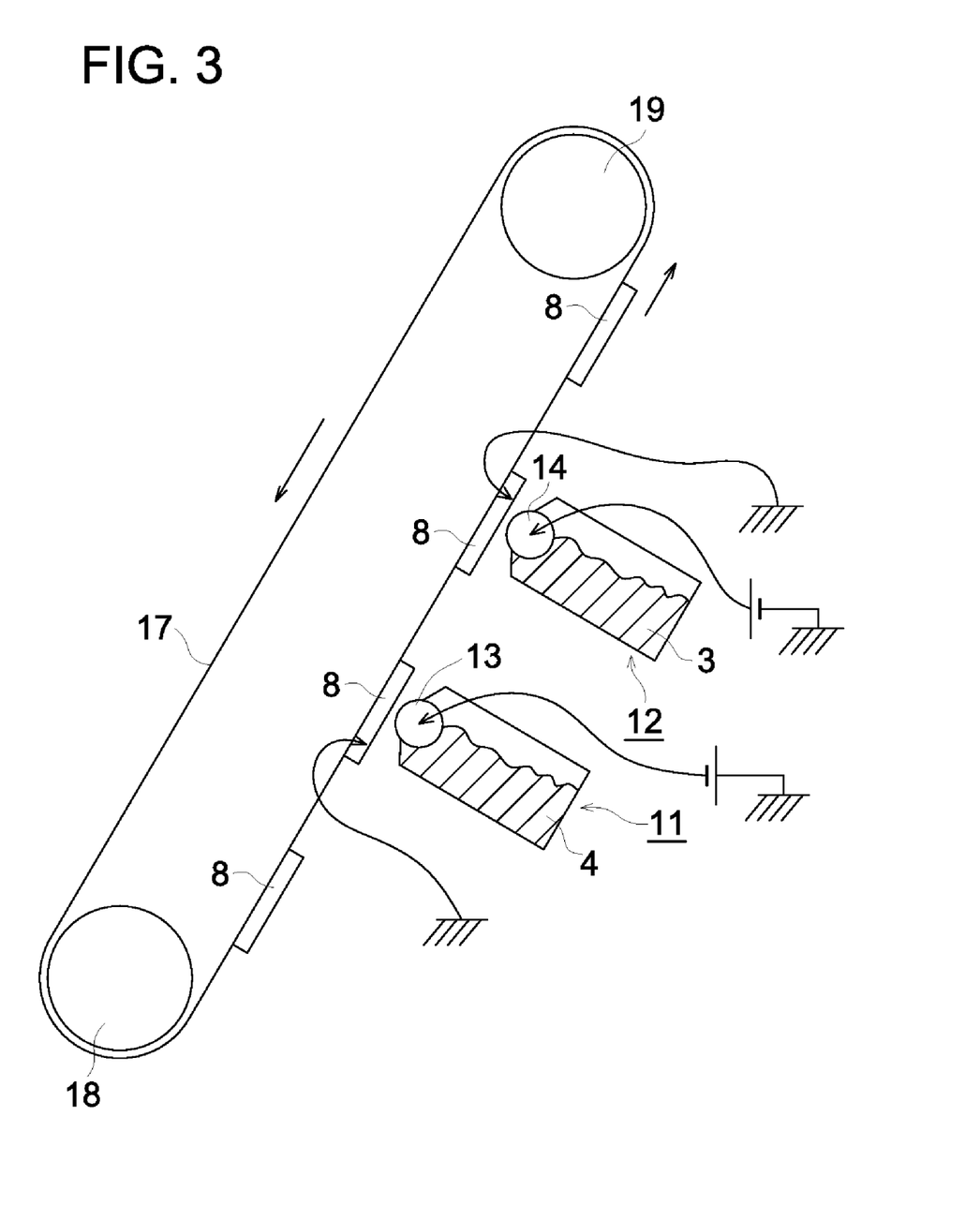
FIG. 3 shows a drawing of an example of apparatus for forming the layer of colored particles used in the invention.

For instance, the colored particles are previously charged by using the apparatus shown in FIG. 3 and put onto the displaying side substrate and/or the back side substrate by a method the same as that for the development in electrophotographic system. In this case, it is important that the colored particles are uniformly put similarly to the development of a solid image.

An example is described, in which positively charged white particles and negatively charged particles are used.

In FIG. 3, a symbol 11 is a device for putting the black particles 4 onto the substrate and 12 is a device for putting the white particles 3 onto the substrate. As the device for putting the particles, a developing device for performing the toner development in the electrophotographic system can be used. The device is neared to the displaying side substrate 8 and/or back side substrate 9 carried by a carrying belt 17 which is rotating by driving rollers 18 and 19 to uniformly form a black particle layer and then a white particle layer on the substrate, and the substrate is pasted with the corresponding substrate so as to make the space between the substrates. Negative DC bias is applied to a developing sleeve 13 of the developing device 11 having the negatively charged black particles 4 and the black particles static electrically adhere onto the displaying side substrate grounded at potential of zero. Positive DC bias is applied to a developing sleeve 14 of the developing device 12 having the positively charged white particles 3 and the white particles static electrically adhere onto the displaying side substrate grounded at potential of zero. Thus the black particles and the white particles each having different electric charge can be transferred by static electric force. The black and white particles can be put into the cell when the substrate having the cells formed thereon is used.

Bias voltage is adjusted usually between about 100 and about 1,000 volts in an absolute value in both positive and negative bias so that required amount of particles are moved to the substrate. AC bias can be applied in addition to DC bias if required to promote the moving of particles. AC bias voltage is adjusted between about 200 and about 3,000 volts so that required amount of particles are moved to the substrate. Frequency of the AC bias is about 500 to 5,000 Hz and an adequate wave form such as sine wave, rectangular wave or saw-tooth wave.

Inversely, it is allowed that the back side substrate 9 on which the colored particles are adhering is covered with the displaying side substrate.

Figure 4:
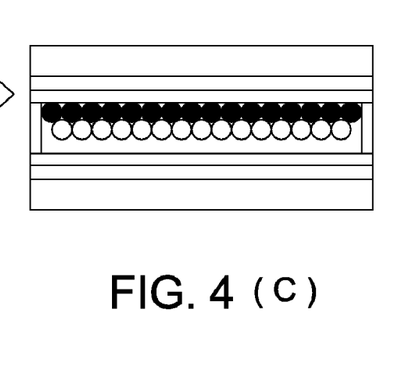
FIGS. 4(A) through 4(C) show a schematic view of preparation process of a substrate having colored particles.

After the particles are moved to the substrate, another substrate is superposed through the partition 7 to prepare a display medium having the black and white particles between the facing substrates; cf. FIGS. 4(A), 4(B) and 4(C).

As above-described, particles different in the color can be static electrically and continuously put onto the substrate and enclosed. In such the process, the developing process of electrophotographic system is applied and the developing device used in the electrophotographic processing can be used.

The developing process including a single component development and two component development may be employed. The developing process including a contact developing process and non-contact developing process may be applied. The non-contact developing is preferable when the colored particles having different colors are adhered to the substrate in sequence since the latter process adhering particles onto the formerly adhered particles would not remove a part of the formerly adhered particles during the latter adhering process.

The developing device according to principle of the electrophotographic process is employed in this invention. A required amount of colored particles is precisely and uniformly adhered to the substrate and further, colored particles having stable and constant charge are obtained during the manufacturing process of the display by employing the developing device. Thus a display medium having stable display density characteristics and uniform density within the display frame are obtained. Further, variation of display properties during the production process is minimized.

A required amount of colored particles is also precisely and uniformly adhered to the substrate even it is flexible. It is advantageous to use a flexible substrate in view of transportation of products and necessary space since it is handled in winding roll shape in preliminary process and in unwinding shape when the particles are adhered thereto temporally in the development process.

A long sheet substrate can be used though a single substrate 8 is processed in FIG. 3.

The substrate prepared by the above developing system is schematically shown in FIG. 4(C). In the schematic drawing, it is expressed that the black particles 4 and white particles 3 are each formed into a single layer on the substrate. However, it is desirable in practice that the layer formation is carried out under a condition so as to form two or more layers of each of the colored particles from the viewpoint of the image density.

A preparation method in which, for example, the black particles are put on the displaying side substrate and the white particles are put on the back side substrate and the substrates are pasted with together may be applied instead of the formation of the double layer of the black and white particles.

In brief, the colored particle layer having uniform charge and uniform thickness can be formed by forming the layer of the white particles or the black particles on the substrate by the method such as that for forming a solid image in the electrophotographic system. As a result of that, the display medium having suitable properties can be prepared.

Colored Particle

When the colored particle is used as the displaying particle for the image display method, a electrically chargeable particle comprising a binder resin and a colorant is used, to which a charge controlling agent and a resistivity controlling agent may be added according to necessity. An inorganic fine particle such as titanium oxide, silica and calcium carbonate may be supplemented.

A volume median diameter of the colored particles of from 0.1 to 50 μm is preferable since suitable clearness of display, and uniformity, suitable coagulation force and moving ability of the particles and sufficient displaying density and contrast can be obtained.

The charging amount of the colored particles is preferably from 0.5 to 4.0 μC/g, and more preferably from 0.7 to 2.0 μC/g in absolute value. When the charging amount is less than 0.5 μC/g, high driving voltage is necessary because driving force caused by Coulomb's force received by the particle in the electric field is lowered. When the charging amount is more than 4.0 μC/g, high driving voltage is also required because reverse electric field is generated by the charge of the particle itself in the course of the movement of the particle and the effect for negating the electric field applied for driving the particle is made notable. The charging amount of the particle is desirably smaller for reducing the reverse electric field caused by the charge of the particle itself but preferably larger for giving the essential ability of moving the particle. Therefore, there is a suitable range of the charging amount. It is considered that the particles having a charging amount of from 0.5 to 4.0 μC/g can be driven by low voltage because such the particles suitably receive driving force and the influence of the reverse direction electric field caused by the movement of the particles is reduced.

The charging amount of the colored particles can be controlled by the method of surface treatment, the inorganic fine particle additive, stirring or shaking time after mixing of the colored particles and the inorganic fine particles and selection of the charge controlling agent. The charging amount can be controlled by varying the amount of the surface treating agent and the treating time and combination use of a positively charging surface treating agent and a negatively charging treating agent.

A charge controlling agent is also usable for controlling the charging amount.

Binder Resin

A binder usually used for chargeable powder particles can be used.

As the resin, a resin capable of giving chargeability to the colored particle such as an acryl type, methacryl type, styrene type, copolymer of the above and polyester type is preferable.

Binder resins usable for electrophotographic toner can be cited as typical examples. For example, a polystyrene type resin, poly(meth)acryl type resin, polyolefin type resin, polyamide type resin, polycarbonate type resin, polyether type resin, polysulfone type resin, polyester type resin, epoxy resin, urea resin, urethane resin, fluoro type resin, silicone type resin and a copolymer, block copolymer, graft polymer and a polymer blend of the above are usable.

Colorant

As the colorant, various kinds and various colors of organic and organic pigments and dyes are usable.

Examples of the black pigment include carbon black, copper oxide, manganese dioxide, aniline black and active carbon. Examples of the white pigment include zinc white, titanium oxide, antimony white and zinc sulfide. For the black and white display, carbon black and titanium dioxide are each preferable as the black colorant and the white colorant, respectively.

Charge Controlling Agent

The charge controlling agent giving charge by triboelectricity to the colored particles can be used.

As the positive charge controlling agent, a nigrosine dye, triphenylmethane compound and quaternary ammonium salt type compound are cited for example. As the negative charge controlling agent, a metal salicylic complex, metal-containing azo-dye, metal-containing (containing a metal ion or metal atom) oil-soluble dye and quaternary ammonium salt type compound are cited for example.

The charge controlling agent can be used within the range of from 0.1 to 10 parts by weight to 100 parts by weight of the binder resin.

Resistance Controlling Agent

Ones similar to the colorant can be used as the resistance controlling agent. A metal oxide having various shapes such as thin flake-like, fiber-like and powder-like, graphite and carbon black can be cited.

Inorganic Fine Particle and Surface Treating Agent Therefore

An inorganic fine particle may be used as an external additive. For example, titanium oxide, silica, aluminum oxide, tin oxide, zirconium oxide, tungsten oxide, calcium oxide and titanium nitride are cited. Among them, silica is preferable.

The average primary particle diameter of the inorganic particles is preferably from 5 to 300 nm, more preferably from 10 to 100 nm and further preferably from 10 to 70 nm.

The charging of the colored particles can be controlled by surface treating the inorganic fine particles. For instance, an aminosilane type coupling agent such as aminopropyl-trimethoxysilane, aminopropyltriethoxysilane, dimethylaminopropyl trimethoxysilane, diethylaminopropyl trimethoxysilane, dipropylaminopropyl trimethoxysilane, dibutylaminopropyl trimethoxysilane, monobutylaminopropyl trimethoxysilane, dioctylaminopropyl dimethoxysilane, dibutylaminopropyl dimethoxysilane, dibutylaminopropyl monomethoxysilane, dimethylaminophenyl triethoxysilane and N-(2-aminoethyl)-3-aminopropyltrimethoxysilane is cited as the surface treating agent for providing positive chargeability to the inorganic particles.

Particularly preferable positively charging inorganic fine particle is a silica fine particle treated on the surface by aminopropyltrimethoxysilane, aminopropyltriethoxysilane and dimethylaminopropyl trimethoxysilane.

Examples of the surface treating agent capable of providing negative chargeability to the inorganic fine particle include a silazane, chlorosilane and alkoxysilane type coupling agent such as hexamethyldisilane, dimethyldichlorosilane, trimethylchlorosilane, methylmethoxysilane, isobutyltrimethoxysilane, hexamethyldisilane, tertbutyldimethylchlorosilane, vinyltrichlorosilane, vinyltrimethoxysilane and vinyltriethoxysilane.

Particularly preferable negatively chargeable inorganic fine particle is a silica fine particle treated on the surface by hexamethyldisilazane.

The surface treatment is carried out by stirring the inorganic fine particles and the surface treating agent. A solvent may be further added. The treatment can be accelerated by heating.

The charging amount can be controlled by varying the amount of the surface treating agent, treating time or treating temperature, or combination use or the positively chargeable surface treating agent and the negatively chargeable surface treating agent.

Preparation Method of Colored Particle

The colored particle can be prepared by a method known as the method for preparing the toner for electrophotographic system. The followings are cited as such the method in which a resin and colorant are mixed, kneaded and solidified and then crashed and classified, a suspension polymerization method in which a monomer and colorant are dispersed in a form of droplets in a dispersing medium by mechanical stirring and polymerized and an emulsion polymerization method in which a monomer is dropped into a emulsifying solution containing a surfactant and polymerized in micelle to form polymer particles of 100 to 150 nm and then a colorant and coagulation agent to form colored particles.

Substrate

At least one of the substrates is one through which the colored particles can be seen from outside.

For example, the support 1 (the support of the displaying side substrate) in FIG. 1 is necessarily transparent and a material having high transparency to visible light is useful. A visible light transmittance of not less than 80% is desirable for viewing sufficiently. On the other hand, the support 2 (the support of the back side substrate) in FIG. 1 is not always necessarily transparent.

Examples of the transparent support include bendable ones such as a sheet of polymer such as poly(ethylene phthalate), poly(naphthalene phthalate), polyethersulfone, polyethylene, polycarbonate, polyimide and polyacryl and a metal sheet and a plate composed of a non bendable inorganic material such as glass and quartz are cited.

The thickness of the support is preferably from 2 to 5,000 μm, and suitably from 5 to 2,000 μm, since sufficient strength, uniformity of the space between the substrates and quality of displaying can be obtained within such the range of the thickness.

The distance between the substrates in the image display medium is allowable as long as the colored particles can be transferred so as to maintain the contrast. The distance is usually controlled so as to be formed from 10 to 500 μm and preferably from 10 to 200 μm. The volume occupying ratio of the colored particles in the space between the facing substrates is preferably from 5 to 70%, more preferably from 10 to 60%. The colored particles can be smoothly transferred and sufficient contrast can be obtained when the occupying ratio is within such the range.

Electrode

As the electrode constitution material, a metal such as aluminum, silver, nickel, copper and gold, an electro-conductive metal oxide such as indium oxide (ITO), indium oxide, antimony tin oxide (ATO), electro-conductive tin oxide and electro-conductive zinc oxide and an electro-conductive polymer such as polyaniline, polypyrrole and polythiophene are exemplified and optionally selected. For preparing the electrode, a method for forming a thin layer of the above material by spattering, vacuum deposition, CVD (chemical deposition) or coating and a method of coating a mixture of an electro-conductive agent, a solvent and a synthesized resin binder are applicable. The electrode to be provided on the displaying side substrate is necessarily transparent and the electrode to be provided on the back side substrate is not necessarily transparent.

The thickness of the electrode provided on the displaying side substrate is suitably from 3 to 1,000 nm, and more preferably from 5 to 400 nm, as long as the electro-conductivity can be maintained and any impediment is not caused in the light transmission. Transmittance of the electrode provided on the back side substrate is desirably not less than 80%. The material and thickness of the electrode to be provided on the back side substrate are similar to those in the electrode to be provided on the display side substrate but it is not necessarily transparent.

Partition

It is preferable that the space is provided between the display side substrate and the back side substrate and the space is divided by suitable partitions to form cells. The shape of partition to be provided between the substrates is optimally decided according to the kind of colored particles relating to the display. The width and thickness of the partition are preferably from 2 to 100 μm and more preferably from 3 to 50 μm. The height of the partition is preferably from 10 to 500 μm and more preferably from 10 to 200 μm. The opening of the cell is preferably from 50 to 1,000 μm.

The cells prevent the charged particles incorporated in a specific area during manufacturing process from dispersing or wandering within the image display medium during the repeated change of displaying. Thus variation of amount of charged particles is prevented, and therefore, undesirable conditions such as variation of display density or color are prevented. There are so many cases the images are required to frequently rewritten when the images are displayed by dot-matrix method. Since display density is required to be uniform after many cycles of image rewriting, it is preferable to provide cells.

In FIG. 2(A), the cells are formed by a partition composed of hexagonal ribs viewed in the horizontal direction of substrate and rectangular ribs are shown in FIG. 2(B), but the shape of the rib is not specifically limited. In the shape of the cell formed by the partition, the size may be the same or different according to the portion thereof.

The partition can be formed on the substrate by an embossing method using a material such as resin, a hot press injection method for forming unevenness according to designated pattern, a photolithographic method or a screen printing method. A processing using a photoresist material capable of being processed by photolithographic treatment may be applied.

Insulation Layer

The insulation layer is preferably formed by using an electrically insulation material such as silicone resin, polycarbonate resin and acryl resin. A photoresist material capable of being processed by photolithographic treatment common with the material of the partition is also usable.

Two-component developer composed of colored particles and carrier is preferably used in a process in which colored particles are moved to the substrate.

Carrier

Any carrier may be used as long as it can hold suitable charging ability for long period.

The volume average particle diameter of the carrier is preferably from 20 μm to 80 μm, the balance of the weight and the surface area of the carrier is suitable and the mixing and stirring ability with the toner and the rising up property of charging are good in such the range though they are depended on the size and the properties of the colored particles.

The volume average particle diameter of the carrier is measured by using Coulter Multisizer, manufactured by Beckman Coulter Inc. The measurement may be carried out by any apparatus as long as the measurement is performed by a principle the same as that in the above apparatus.

A carrier comprising of a core material (magnetic particle) coated with a resin coating layer on the surface thereof is usually used.

As the method for coating the resin layer onto the core material, a dry resin coating method (dry-coat method) in which fine particles of coating rein are put on the surface of magnetic particle as the core material and then subjected to heating or mechanical impact and a wet resin coating method (wet-coat method) in which a resin solution for coating is coated on the surface of core material and then dried are applicable. The dry-coat method, particularly a method in which the rein fine particles for coating are static electrically put on the core particle surface and repeatedly subjected to heating and mechanical impact is desirable. Such the method has a merit that the stability as to the environment (stability of charge depending on the environmental condition) is high because no solvent is used in the process so that the influence of the solvent remaining in the resin on the electric charging property and the image quality is not caused.

The coating treatment by dry-coat method can be performed by using a stirring mixer capable of physically giving impact. As a concrete example of the stirring mixer, Henschel mixer is usable, in which blades are rotated at high speed in a vessel for stirring and mixing.

As the core material, ones having relatively high saturation magnetization are used among the magnetic materials usable for the carrier of electrophotographic double-component developer.

Concrete examples of the core material include ferrite, magnetite and maghemite. Ferrite is preferably used.

Ferrite is a metal compound represented by the formula Of $M^{II}O\ Fe_2O_3$.

In the above formula, $M^{II}$ is one or more kinds of divalent metal selected from the group consisting of Mn, Fe, Co, Ni, Cu, Zn and Mg.

As preferable concrete examples of ferrite, Mn—Mg type ferrite (in the above formula, $M^{II}$ is Mn and Mg), Mn—Zn type ferrite (in the above formula, $M^{II}$ is Mn and Zn) and Ni—Zn type ferrite (in the above formula, $M^{II}$ is Ni and Zn) are cited. Among them, Mn—Mg type ferrite is most preferable.

As the resin for coating, homopolymer or copolymer prepared by polymerizing one or more monomers selected from the group consisting of acryl type monomers, methacryl type monomers and styrene type monomers is used.

Concrete examples of the acryl type monomer include acrylic acid, methyl acrylate, ethyl acrylate, butyl acrylate, propyl acrylate, octyl acrylate, dodecyl acrylate, lauryl acrylate, 2-ethylhexyl acrylate, cyclohexyl acrylate, stearyl acrylate, 2-chloroethyl acrylate, phenyl acrylate, dimethylaminoethyl acrylate, diethylaminoethyl acrylate, methyl α-chloroacrylate and derivatives thereof.

Concrete examples of the methacryl type monomer include methacrylic acid, methyl methacrylate, ethyl methacrylate, butyl methacrylate, isobutyl methacrylate, propyl methacrylate, octyl methacrylate, dodecyl methacrylate, lauryl methacrylate, 2-ethylhexyl methacrylate, cyclohexyl methacrylate, stearyl methacrylate, 2-chloroethyl methacrylate, phenyl methacrylate, dimethylaminoethyl methacrylate, diethylaminoethyl methacrylate and derivatives thereof.

Concrete examples of the styrene type monomer include styrene, o-methylstyrene, m-methylstyrene, p-methylstyrene, p-methoxystyrene, p-phenylstyrene, p-chlorostyrene, p-ethylstyrene, p-n-butylstyrene, p-tert-butylstyrene, p-n-hexylstyrene, p-n-octylstyrene, p-n-nonylstyrene, p-n-decylstyrene, p-n-dodecylstyrene, 2,4-dimethylstyrene, 3,4-dichlorostyrene and derivatives thereof.

Among the polymers composed of the above monomers, an acryl type polymer using acryl type monomer and/or methacryl type monomer in a ratio of not less than 50%, particularly not less than 70%, by weight of the whole constituting monomers is preferable. The acryl type polymer is effective when the negatively chargeable colored particles are used since the acryl type polymer tends to be positively charged. Moreover, adhesiveness between the core material and the resin is enhanced by the use of the acryl type polymer and the durability of the carrier is further improved.

Use of the polymer, especially acryl type polymer, containing the styrene type monomer, particularly styrene as the constituting monomer, is preferable from the viewpoint of charging property of the carrier, particularly stability of charge as to the environment. In such the case, the content of the styrene type monomer is not more than 50%, preferably not more than 30%, further preferably from 1 to 25%, by weight of the whole constituting monomers from the viewpoint of further improvement of the charging property of the carrier, particularly stability of charge as to the environment. Monomers other than the above-mentioned may be used for the monomer constituting the coating resin.

The above resins are preferably prepared by a suspension polymerization method, emulsion polymerization method or non-emulsification polymerization when the resin is used as the resin fine particle for coating. Particularly, the resin fine particles for coating prepared by the emulsion polymerization is preferable since the size distribution of such the resin particles is narrow so that the uniformly coating can be made on the carrier particle.

Suitable range of the number average primary particle diameter of the resin fine particles for coating is from 30 to 200 nm and preferably from 50 to 150 nm. The glass transition point (Tg) and the softening point (Tm) of the resin fine particle for coating are not specifically limited though a Tg of from 80 to 120° C., particularly from 90 to 115° C., and a Tm of 150 to 250° C., particularly from 160 to 230° C., are preferable.

The amount of the coating agent on the carrier is preferably from 1 to 4%, particularly from 2 to 3.5%, by weight of the whole carrier is suitable from the viewpoint of effective prevention of carrier adhesion and improvement in the rising up of charging.

Preparation of Developer

The developer can be obtained by mixing the carrier and the colored particles. The mixing ratio of the carrier and the colored particles is not specifically limited and a weight ratio (carrier/colored particles) of from 96/4 to 85/15, particularly from 95/5 to 90/10, is suitable. As the mixing means, a mixture available on the market such as a V-type blender can be used.

Charging Amount

The charging amount described here is the charging mount measured as to the particles practically enclosed, which is different from the charging amount of the particles measured in the state of before the enclosing. In the case of a sample enclosing two kinds of color particle each different in the polarity, voltage sufficient for transferring each of the particles to each of the facing substrates having electrode is applied to separate the particles and then the particles adhering onto each of the substrates are subjected to the charging amount measurement.

For example, a usually known charging amount measuring method such as a blow-off method can be applied.

The separated substrate on which the particles are adhering was cut into a size of 20 mm×20 mm, or a substrate originally having the size of 20 mm×20 mm is used. On this occasion, insulation is maintained of course so as to give no influence to the charging amount. The substrate of the above size is connected to a charge measuring apparatus such as a Coulomb meter while maintaining the insulated state and then the particles are blown off by compressed air or nitrogen gas and the total charging amount is calculated from the variation of charge of the substrate. On this occasion, the weight of the particles subjected to the measurement can be known from the variation of the weight of the substrate when the weight of the substrate is previously weighed, thus the charging amount per weight can be calculated.

Image Display Method

Thus prepared image display medium in which two kinds of colored particles having different color and different polarity of charges are incorporated can display an image by applying an electric field by applying DC voltage between the electrodes provided on the substrates. Display color can be switched by reversing the polarity of applied DC voltage. Applying voltage is set between 10 and 300 volts so that sufficient image density can be displayed by taking a driving characteristics of the display medium into consideration.

An arbitral characters or an image can be displayed by a dot matrix method. An electrode having a plurality of strips is provided orthogonally on each substrate to display by the dot matrix method. The dot matrix image of characters or an image is formed by applying driving voltage to individual strip electrodes on each substrate according to image information.

EXAMPLES

The invention is concretely described referring examples below. In the description, "part" means "part by weight".

Example 1

Preparation of Colored Particle

Positively chargeable white particle and negatively chargeable black particles were prepared as follows.

(White Particle)

One hundred parts of styrene-acryl resin having a weight average molecular weight of 20,000 and 100 parts of anatase type titanium oxide having a number average particle diameter of 150 nm were uniformly mixed by a mixing apparatus such as a Henschel mixer and then kneaded, crushed and classified to obtain white fine particles having a particle diameter of 8.2 μm and a CV value of 20.

To the above white fine particles, silica fine particles of 50 nm coupling-treated by aminopropyltrimethoxysilane was added and treated by Hybridizer, manufactured by Nara Kikai Co. Ltd., at 15,000 rpm for 10 minutes for smoothing the particle surface and making sphere the particles. Thus positively chargeable white particles having a spherical degree of 0.93 were obtained. Furthermore, 1.0 part of silica particles having an average diameter of 15 nm and treated by aminopropyltrimethoxysilane as the coupling agent were added to the above obtained white particles to prepare white particles.

Black Particle

A surfactant solution prepared by dissolving an anionic surfactant (sodium dodecylsulfate) in deionized water was put into a 5,000 ml separable flask on which a stirrer, thermal sensor, cooler pipe and nitrogen introducing device were attached, and the content of the flask was heated by 80° C. while stirring under nitrogen gas stream.

An initiator solution prepared by dissolving 9.2 g of an initiator (potassium persulfate) in 200 g of deionized water was added to the above surfactant solution, and the temperature of the mixture was adjusted to 75° C. After that, a monomer mixture composed of 70.1 g of styrene, 19.9 g of n-butyl methacrylate and 10.9 g of methacrylic acid was dropped to the above solution spending 1 hour. The resultant system was heated and stirred at 75° C. for 2 hours for polymerization to prepare resin particle dispersion.

In 1,600 ml of deionized water, 59.0 g of an anionic surfactant of sodium dodecylsulfate was dissolve by stirring and 420.0 g of carbon black Regal 330, manufactured by Cabot inc., was gradually added to the resultant solution while stirring and then subjected to dispersion treatment by CLEARMIX, manufactured by M-Technique Co., Ltd., to prepare a colorant dispersion.

Into reaction a vessel (four-mouth flask) on which a thermal sensor, cooling pipe, nitrogen introducing device and stirrer were attached, 420.7 g (in terms of solid component) of the resin dispersion, 900 g of deionized water and 166 g of the colorant dispersion was charged and stirred, and the temperature of the contents was adjusted to 30° C., and then a 5 mol/L sodium hydroxide solution was add to adjust pH value to 8.0 to 10.0.

After that, a solution prepared by dissolving 12.1 g of magnesium chloride hexahydrate in 1,000 ml of deionized water was added spending 10 minutes at 30° C. After standing for 3 minutes, the temperature of system was raised by 90° C. spending a time of from 6 to 60 minutes for accelerating formation of associated particles. Then the temperature was lowered by 30° C. and pH value was adjusted to 2.0 by adding hydrochloric acid and then stirring was stopped. The resulted associated particles were filtered and repeatedly washed by deionized water at 45° C. and dried by warmed air at 40° C. to obtain colored particles. Thus obtained black particles had a particle diameter of 9.5 μm, a CV value of 22 and a spherical degree of 0.96.

To the obtained black particles, 1.0 part of silica particles having an average particle diameter of 15 nm and treated by hexamethyldisilazane as the coupling agent were added to obtain black particles.

Preparation of Dry-Coat Carrier

Resin fine particles for carrier coating was prepared as follows/

(Resin Fine Particle for Carrier Coating)

Preparation Example 1

A mixture of CHMA (cyclohexyl methacrylate), MMA (methyl methacrylate) and styrene in a monomer weight ratio of 45/45/10 was polymerized by known emulsion polymerization method and then the resulted polymer was washed and dried to obtain rein fine particles having an average particle diameter of 100 μm (Tg: 102° C., Tm: 220° C.).

(Preparation Example of Dry-Coat Carrier)

Coated carrier was prepared according to the following method.

Five kilograms of Mn—Mg type ferrite core particles and 150 g of coating agent were put into 9L Henschel mixer, manufactured by Mitsui Mining Co., Ltd., capable of controlling temperature and stirred for 20 minutes at a blade rotation rate of 200 rpm while controlling the temperature of the content to a temperature of not more than 90° C. After that, the blade was rotated at 200 rpm while circulating temperature controlled oil through the jacket, and the content was heated by 115° C. and then further stirred for 15 minutes while holding the temperature to coat the coating agent onto the core particles. After that, the content was slowly stirred until the temperature of the content is lowered by 70° C. or less. Thus a carrier was prepared.

The coated amount of the coating agent of the carrier calculated from the weight of the used core particles and that of the obtained carrier was 2.8%.

Preparation of Image Display Medium (Formation of Insulating Layer and Partition)

On a PET support with an ITO transparent electrode thereon which had a surface resistance of 20 Ω☐, a visible light transmittance of 85% and a thickness of 120 μm, an insulation layer of 3 μm was formed using epoxy type photoresist SU-8, manufactured by Micro Chem Inc., and subjected to designated curing treatment.

On the insulation layer, a hexagonal honeycomb-shaped partition having a thickness of 10 μm, a height of 40 μm and a opening diameter of 100 μm was formed and cured by light according to usually know photolithographic method and subjected to a baking treatment. The partition and the insulation layer were not formed at the edge portions of the support. Thus obtained substrate was referred to as Substrate A.

Besides, an insulation layer of 3 μm was formed by SU-8 on a PET substrate having the same transparent electrode. The resulted substrate was referred to as Substrate B.

(Assembling of Image Display Medium)

The black particles and the foregoing carrier were shaken and mixed for 20 minutes by a V-blender in a ratio of black particle/carrier of 5% by weight to prepare a two-component black developer.

Besides, the white particles and the foregoing carrier were shaken and mixed by a V-blender in a ratio of white particle/carrier of 5% by weight to prepare a two-component white developer.

The black developer and the white developer were enclosed in the partition on Substrate A using the non-contact type developing device shown in FIG. 3. On the occasion of the development, an AC bias and DC negative developing bias were applied to the black particles and an AC bias and DC positive developing bias were applied to the white particles. The developing bias was controlled so that the adhering amount of the black particles and that of the white particles were each 0.7 mg/cm² and 1.2 mg/cm², respectively.

The white and black particles adhering on the partition were removed and Substrate A was pasted with Substrate B so that a space of 40 μm was formed between the substrates to prepare an image display medium.

After preparation of the image display medium, the black and white particles were separated by displaying black and white images by applying voltage and the electric charging amount of each of the colored particles was measured by the blow-off method according to the following charging amount measurement procedure. The charging amount of each of the white particles and the black particles was +2.0 μC/g and −3.0 μC/g, respectively.

(Measurement of Charging Amount)

The charging amount is that of the particles practically enclosing in the image display medium. In concrete, the charging amount was measured by the following procedure.

Separation of Two Colored Particles

1. An image display medium was prepared by enclosing the particles between the substrates of 20 mm×20 mm.

2. Direct current voltage of 200 V was applied between the two electrodes for 10 seconds and the same voltage with reversed polarity was applied for 10 seconds for reversely displaying two colors, such the reversely displaying was counted as one time. After carrying out of 10 times of reversely displaying, the direct current voltage was turned off. The colored particles were separated into each of the colors and put on each of the substrates by the above procedure.

3. The two substrates were separated to prepare sample substrates each having each of the colored particles, respectively.

Measurement of Charging Amount

Charge of the charged particles was measured by the blow off method described below.

1. Weight M1 (g) of the substrate on which the particles were adhering was measured by an analytical balance CP224S, manufactured by Sartorius K. K.

2. The toner on the sample substrate was blown off by dried nitrogen gas and the amount of reversal polarity charge Q (μC) caused on the electrode on the substrate was measured by a digital electrometer R8252, manufactured by ADC Corp.

3. The weight M2 (g) of the substrate from which particles had been blown off was measured by the analytical balance CP224S, manufactured by Sartorius K. K.

4. The charging amount of the toner Q/M (μC/g) was calculated by the following Equation 1.

Charging amount: $Q/M=Q/(M2-M1)$  Equation 1

Examples 2 to 3

In Example 2, an image display medium was prepared, in which the amount of the amino-coupling treated silica particles of 15 nm to be added to the white particle was changed to 1.5 parts and the amount of silica particles of 15 nm for the black particles was changed to 1.5 parts.

The charging amount of the white particles measured by the same manner as in Example 1 was +3.0 μC/g and that of the black particles was −3.5 μC/g.

In Example 3, the diameter of the silica particles of 15 nm in Example 1 was changed to 20 nm. The charging amount of the white particles measured by the same manner as in Example 1 was +2.0 μC/g and that of the black particles was −2.0 μC/g.

Example 4

Example 4 was carried out in the same manner as in Example 1 except that the formation of the insulation layer and the partition was prepared as follows.

(Formation of Insulation Layer and Partition)

On a PET support with an ITO transparent electrode thereon which had a surface resistance of 20 Ω□, a visible light transmittance of 85% and a thickness of 120 μm, an insulation layer of 3 μm was formed by a wet coating method using BPZ polycarbonate material having a molecular weight of 20,000.

On the insulation layer, a BPZ polycarbonate partition was formed by hexagonal honeycomb-shaped embossing having a thickness of 10 μm, a height of 50 μm and an opening diameter of 100 μm. The partition and the insulation layer were not formed at the edge portions of the support. Thus obtained substrate was referred to as Substrate C.

Besides, an insulation layer of 3 μm was formed by BPZ polycarbonate on a PET substrate having the same transparent electrode. The resulted substrate was referred to as Substrate D.

An image display medium was prepared in the same manner as in example 1 except that Substrates A and B were replaced by Substrates C and D, respectively.

After preparation of the image display medium, white and black were displayed for separating each colored particles and the charging amount of the each of the particles was measured by the blow-off method. The charging amount of the white particles was +2.0 μC/g and that of the black particles was −3.0 μC/g.

Examples 5 to 8 and Comparative Examples 1 to 12

Examples 5 to 8 and Comparative Examples 1 to 12 were prepared in the same manner as in Example 1 except that the shaking-mixing time of the developer was changed so the charging amounts of the black and white particles were each as shown in Table 1 and image display media were prepared and subjected to the evaluation in the same manner as in Example 1 to examine the properties thereof.

Comparative Examples 13 and 14

In Comparative Example 13, an image display medium was prepared, in which the amount of the amino-coupling treated silica particles of 15 nm to be added to the white particles was changed to 2.0 parts and that of the silica particle of 15 nm was hanged to 2.0. The charging amount of the white particles measured in the same manner as in Example 1 was +4.0 μC/g and that of the black particles was −6.0 μC/g.

In Comparative Example 14, an image display medium was prepared in which the silica particles of 15 nm were not added to both of the white and black particles. The other points were the same as in Comparative example 1.

Evaluation of Displaying Property

Properties of each of the image display media were evaluated by applying direct current voltage between the two ITO electrodes of the image display medium.

Voltage to be applied to the upper side ITO electrode of the image display medium was varied from 0 V to 250 V at an interval of 50 V and the density of displayed image was measured at each of the applying voltage by a reflective densitometer PDA65, manufactured by Konishiroku Photo Industrial Co., ltd. The measurement was carried out at optional 5 points and the mathematical average of the measured result was defined as the reflective density. After that, applying voltage was varied from +250 V to −250 V at an interval of 50 V and the reflective density was measured at each of the voltage. And then applying voltage was varied from −250 V to 0 V at an interval of 50 V and the reflective density was measured at each of the voltage. A hysteresis curve relating to the variation of voltage applying to the upper side electrode of from 0 V and returned to 0 volt through positive side and negative side can be obtained by the above series of procedure.

It was observed in the entire cases of the examples and the comparative examples that the display was changed from white to black by applying positive voltage to the upper side electrode when white was displayed on the upper side ITO electrode.

(Lowest Driving Voltage)

The lowest driving voltage, black density, white density and contrast were determined from the above obtained hysteresis curve as follows.

Black density: Reflective density when 250 V was applied.
White density: Reflective density when the applying voltage was returned to 0 volt.
Contrast: (Black density)−(White density)
Lowest driving voltage: Voltage in volt necessary to make the displaying density of [White density+(Black density−White density)×0.1] when the applying voltage was changed 0 V to 250 V at an interval of 50 V.

Evaluation results are shown in Table 1.

TABLE 1

| | White particle (μC/g) | Black particle (μC/g) | Reflective density | | | Lowest deriving voltage (V) |
| --- | --- | --- | --- | --- | --- | --- |
| | | | White density | Black density | Contrast | |
| **1 | +2.0 | −3.0 | 0.22 | 1.60 | 1.38 | 20 |
| **2 | +3.0 | −3.5 | 0.20 | 1.65 | 1.45 | 10 |
| **3 | +2.0 | −2.0 | 0.22 | 1.60 | 1.38 | 20 |
| **4 | +2.0 | −3.0 | 0.25 | 1.50 | 1.25 | 30 |
| Comp. 1 | +0.4 | −0.4 | 0.60 | 0.80 | 0.20 | 20 |
| Comp. 2 | +0.4 | −0.6 | 0.60 | 1.00 | 0.40 | 20 |
| Comp. 3 | +0.4 | −3.9 | 0.70 | 1.10 | 0.40 | 80 |
| Comp. 4 | +0.4 | −4.1 | 0.70 | 1.20 | 0.50 | 100 |
| Comp. 5 | +0.6 | −0.4 | 0.50 | 0.80 | 0.30 | 30 |
| **5 | +0.6 | −0.6 | 0.30 | 1.50 | 1.20 | 30 |
| **6 | +0.6 | −3.9 | 0.40 | 1.40 | 1.00 | 80 |
| Comp. 6 | +0.6 | −4.1 | 0.30 | 1.50 | 1.20 | 100 |
| Comp. 7 | +3.9 | −0.4 | 0.30 | 0.60 | 0.30 | 40 |
| **7 | +3.9 | −0.6 | 0.40 | 1.50 | 1.10 | 40 |
| **8 | +3.9 | −3.9 | 0.30 | 1.50 | 1.20 | 70 |
| **9 | +1.5 | −1.5 | 0.19 | 1.68 | 1.49 | 10 |

TABLE 1-continued

| | White particle (μC/g) | Black particle (μC/g) | Reflective density | | | Lowest deriving voltage (V) |
| --- | --- | --- | --- | --- | --- | --- |
| | | | White density | Black density | Contrast | |
| Comp. 8 | +3.9 | −4.1 | 0.40 | 0.80 | 0.40 | 100 |
| Comp. 9 | +4.1 | −0.4 | 0.60 | 0.80 | 0.20 | 70 |
| Comp. 10 | +4.1 | −0.6 | 0.30 | 1.20 | 0.80 | 85 |
| Comp. 11 | +4.1 | −3.9 | 0.60 | 0.80 | 0.20 | 80 |
| Comp. 12 | +4.1 | −4.1 | 0.70 | 0.90 | 0.20 | 110 |
| Comp. 13 | +4.0 | −6.0 | 0.60 | 1.20 | 0.60 | 100 |
| Comp. 14 | +4.0 | −6.0 | 0.70 | 1.10 | 0.40 | 100 |

**Example, Comp.: Comparative example

As is shown in Table 1, the image display media Examples 1 to 9 were low in the lowest driving voltage, high in the black density, low in the white density and high in the contrast. Contrary to that, the image display media Comparative examples 1 to 14 were higher in the lowest driving voltage, lower in the black density, higher in the white density and insufficient in the contrast.

The invention claimed is:

1. A preparation method of an image display medium comprising a pair of substrates each having an electrode and colored particles between the pair of substrates, wherein the method comprises the steps of, charging the colored particles, transferring the charged colored particles to one of the substrate electrostatically, and superposing another substrate to cover the transferred charged colored particles, wherein the charging and the transferring steps are conducted by a developing device employed in an electrophotographic process.

2. The preparation method of claim 1, wherein the colored particles are charged by mixing the colored particles with carrier particles.

3. The preparation method of claim 2, wherein the carrier particles are resin coated ferrite carrier particles.

4. The preparation method of claim 1, wherein the colored particles comprise two kinds of particles each having a different color and an opposite electric charge.

5. The preparation method of claim 1, wherein two developing devices are employed, each of which contains the colored particles having a different color and an opposite electric charge.

6. The preparation method of claim 1, wherein the charging and the transferring steps are conducted by a developing device containing black particles having negative charge and a developing device containing white particles having positive charge.

7. The preparation method of claim 1, wherein the colored particles have a volume median particle diameter of 0.1 to 504 m.

8. The preparation method of claim 1, wherein the colored particles have an absolute electric charge of 0.5 to 4.0 RC/g.

9. The preparation method of claim 1, wherein the colored particles comprises inorganic particles.

10. The preparation method of claim 9, wherein the inorganic particles are silica.

11. The preparation method of claim 8, wherein the inorganic particles are selected from the group consisting of titanium oxide, silica, aluminum oxide, tin oxide, zirconium oxide, wolfram oxide and titanium nitride.

12. A preparation method of an image display medium comprising a pair of substrates each having an electrode and colored particles between the pair of substrates, wherein the method comprises steps of, carrying one of the substrates, charging the colored particles and transferring the charged colored particles to the substrate electrostatically by employing a developing device employed in an electrophotographic process during the substrate is carried, and superposing another substrate to cover the transferred charged colored particles.

13. The preparation method of claim 12, wherein two developing devices are employed, each of which contains colored particles having a different color and an opposite charge each other.

* * * * *